United States Patent Office 2,805,940
Patented Sept. 10, 1957

2,805,940

PROCESS FOR EXTRACTING COBALT AND NICKEL FROM THEIR ORES

Hans Oluf Bennedsen, New York, N. Y.

No Drawing. Application August 20, 1954,
Serial No. 451,285

3 Claims. (Cl. 75—119)

The present invention is concerned with the hydrometallurgical recovery of non-ferrous metals, particularly of cobalt and nickel. More specifically, it is concerned with a novel leaching method whereby such metal values may be dissolved as their sulfates from ores containing such extraneous contaminants as arsenic, antimony, selenium, tellurium and the like.

Recent years have seen a marked growth in commercial interest in processes for the hydrometallurgical recovery of cobalt and nickel. Such processes involve the basically simple steps of dissolving the desired metal values as soluble salts thereof; purification of the salt solution, usually by some process in which the solution is concentrated in cobalt and nickel values; and the recovery of the metal values by precipitation with a reducing agent, usually a reducing gas. The present invention is primarily concerned with the leaching step.

From time to time, various proposals for novel leaching processes adapted to specific situations have been proposed. In the case with which the present invention is concerned, none of these proposals have been as wholly acceptable as could be desired. Particularly is this true of leaching processes for many naturally occurring ores of cobalt and nickel in which the metal values, particularly cobalt, are chemically associated in the mineral with arsenic as arsenides or sulfarsenides and less frequently with antimony, selenium and tellurium. Such ores usually contain some "sulfide" sulfur. Unfortunately, this amount frequently is insufficient to supply the amount of sulfur stoichiometrically required to form sulfates of the metal values which it is desired to extract and in addition form sulfates of any other acid soluble constituents of the ore. Alternatively, often there may be a large excess.

Sulfarsenides of nickel and cobalt, for example, have been successfully leached in a high-temperature, high-pressure process by forming the powdered ore into a slurry with water and treating the slurry with oxygen at elevated temperatures up to about 250° C., or higher. If there is a sulfide deficiency, such a process is disclosed in U. S. Patent No. 2,686,114, it is not directly applicable to the arsenides, sulfarsenides and the like with which the present invention is concerned. This deficiency can be overcome by adding sufficient pyrite to the slurry to provide adequate amounts of sulfur.

In such a high-temperature process, pyrite, whether originally present or added later, is necessary for another reason. In such a process, arsenic is dissolved and due to the high temperature range and extended treating time tends to oxidize to the higher valent form and produce more soluble arsenic compounds. To the extent that arsenic and iron are present in stoichiometric equivalents they combine and precipitate as a highly insoluble iron-arsenic compound, presumably a ferric arsenate which may be readily discarded without contravening conservation laws.

Unfortunately, this high-temperature process may produce a large excess of free sulfuric acid by an expensive method. Such an excess must be neutralized, an added expense. This problem is even more exaggerated when there is an original pyrite excess. Not only is more acid produced but excessive iron may remain in solution.

Moreover, because of gas compression costs and apparatus requirements, it is desirable to keep the operating temperature (and resultant necessary pressure) as low as possible, preferably below 175° C. This could not be done in the known process. At the same time, it is highly desirable to accomplish sufficiently complete extraction of non-ferrous metal in the shortest possible time. A process which will accomplish this in less than about two hours is considered satisfactory. Unfortunately, the high temperature process frequently required much longer.

It has been proposed to increase the speed of leaching by adding to the leach liquor mixture some small amounts of nitric acid. Even this proposal, which is an improvement on the high-temperature, sulfuric acid treatment does not wholly accomplish the desired result. With many ores, the requisite treating time still is longer than desirable and extraction may be low. This is clearly demonstrated in the following Examples 1 and 2 which show the deficiency of such a process to obtain the desired result in a reasonable length of time.

These examples are intended as illustrative only and not by way of limitation. In all of the examples, the cobalt mineral values are contained in an arsenide ore which assays about 9.6% Co, 43% As and 1.2% S. The pyrite used assays about 47.2% S and 42.6% Fe. All parts are by weight unless otherwise noted.

Example 1

A slurry is prepared containing 500 parts of the cobalt arsenide ore, 200 parts of the pyrite, 1650 parts of water; and nitric oxide (NO) equivalent to 50 parts of $HNO_3$ is added. This mixture is treated in a stirred autoclave at about 150° C., for about two hours, the pressure being maintained at about 150 pounds per square inch (p. s. i. g.) with oxygen gas. At the end of the time period, analysis of the residue shows 72% of the Co to remain undissolved.

Example 2

Example 2 is repeated using nitric oxides (NO) equivalent to 65 parts of $HNO_3$. At the end of the time period 47% of the Co still is found to remain undissolved.

It is therefore the object of the present invention to provide a process which overcomes this difficulty in a simple but efficient manner.

In general, the process of the present invention accomplishes the desired result by conducting the operation in two steps. In the first, pyrite is treated for a short length of time with the nitric acid, in the presence of sufficient oxygen to continuously regenerate nitric acid from the evolved nitrogen oxides. Thereafter, metal values to be recovered are added as ore or concentrate and the mixture is treated with oxygen at elevated temperature for a short period of time.

This improved procedure of dividing the process into separate steps has a number of advantages. The total amount of pyrite needed in the overall process is small compared to the amount of arsenide. Therefore the nitric acid concentration can be much higher during pyrite dissolution than during subsequent arsenide treatment. All of the nitric acid needed for subsequent oxidation of the arsenide ore can be added in this way. Because of the relatively higher nitric acid concentration during the pyrite treatment, the temperature and time requirements are minimized and oxidation of arsenic to the more soluble higher-valent form is minimized.

Pyrite either may be oxidized in the same vessel in which the ore is to be oxidized or in a separate vessel. Nitric acid may be supplied as such or as nitric oxide gas (NO) or as any mixture containing nitrogen oxide gases. All of the sulfur present in the pyrite is available for making sulfates of the leachable metals present in the arsenide ore because iron is precipitated with arsenic which becomes solubilized during the leaching process. This reduces the amount of pyrite required as well as minimizing the production of excess free sulfuric acid.

The requirements of the process are essentially simple. A relatively small amount of nitric acid is used because it is continually regenerated by the oxygen which is supplied during both the treatment of pyrite with nitric acid and later in the treatment of the arsenide. In general, from about 2–20 parts of nitric acid should be supplied per hundred parts of arsenide ore to be treated, preferably about 5–10 parts per hundred parts of ore will be found to be good practice. Added pyrite should be in but slight excess over the stoichiometric requirements based on the sulfur needed. This is readily calculated by known methods.

Successful leaching within the two hour limit for practical operation is readily obtained using in both steps a temperature of from about 100° C. to about 200° C. The preferred range is about 125° C.–175° C., and good practice is from about 130° C., to about 150° C. This compares very favorably with plus 250° C., which is necessarily employed in the previously-known high-temperature, high-pressure oxidation leaching of sulfide ores. In both steps, a positive over-pressure of oxygen gas should be maintained on the vessel. An oxygen partial-pressure of 100–150 p. s. i. g. is preferred, but this range may be extended to about 10–250 p. s. i. g. if desired. Oxygen may be furnished in any available gas form, preferably as oxygen gas but equally successfully as oxygen-enriched air or air. Overall oxygen efficiency is very high, whatever the nature of the oxidizing gas used. The principal advantage of using oxygen gas is that no equipment for recovering nitrous gases from exit inert gases is required.

The efficiency of the present process is readily demonstrated, as for example by the following experiment; again the example being intended as illustrative only and the same minerals used in the preceding examples being used.

*Example 3*

In about 1150 parts of water is slurried about 300 parts of pyrite and sufficient nitric oxide (NO) gas to make about 100 parts of nitric acid. The mixture is heated in a stirred autoclave at about 130° C. and agitated for about 20 minutes under an over-pressure of about 200 p. s. i. g. maintained with oxygen. When the autoclave is opened and examined, pyrite is found substantially completely dissolved.

Approximately one-half of the so-obtained reaction liquor is admixed with about 1100 parts of water, and 500 parts of cobalt-arsenide ore. If necessary, nitric acid concentration is adjusted to about 30 grams per liter with NO gas and the slurry is stirred at about 130° C., under an overpressure of 150 p. s. i. g. of oxygen, for about one and one-half hours. The solids residue is removed and analyzed. It comprises about 591 parts of dried solids containing 0.3% cobalt, corresponding to about 4% of the original cobalt charged.

While the foregoing examples have been primarily concerned with arsenic as arsenides or sulfarsenides as the metalloids most commonly encountered, it should be noted that as stated above, the invention is not so limited. Selenides, stibnites and tellurides when encountered in the field may be treated equally applicably with consistently conformable results by the process of the present invention.

I claim:

1. In extracting cobalt and nickel values from an ore thereof, which ore also contains iron, sulfur and at least one metalloid selected from arsenic, antimony, selenium and tellurium, the process which comprises the steps of: chemically determining, for an amount or ore to be treated, the content to be dissolved of acid-soluble, non-ferrous metals including cobalt and nickel, and the amount of sulfur stoichiometrically equivalent to sulfates thereof; forming with dilute aqueous nitric acid a first slurry containing a sufficient amount of iron sulfide containing solids to furnish about said determined amount of sulfur; at from about 100° to about 200° C. and under a positive partial over-pressure of oxygen, agitating said first slurry until a major portion of the iron sulfide content of said solids is oxidized and dissolved; then forming a second slurry containing the resultant solution, said amount of ore to be treated and any requisite additional amount of nitric acid to furnish from about two to about twenty parts of nitric acid per hundred parts of said ore; and agitating resultant slurry at from about 100°–200° C. under a positive partial over-pressure of oxygen until dissolution of metal values substantially ceases.

2. A process according to claim 1 wherein said iron sulfide containing solid is pyrite.

3. A process according to claim 1 wherein said second slurry is treated at a temperature and under an oxygen partial pressure so-maintained that said non-ferrous metal dissolution is completed in less than about one and one-half hours.

References Cited in the file of this patent

UNITED STATES PATENTS

| 401,056 | Perins | Apr. 9, 1889 |
| 548,580 | McCulloch | Oct. 22, 1895 |
| 981,451 | McKechnie | Jan. 10, 1911 |

FOREIGN PATENTS

| 15,849 | Great Britain | July 8, 1911 |
| 508,533 | Belgium | June 19, 1953 |

OTHER REFERENCES

Willard et al.: "Advanced Quantitative Analysis," New York, N. Y., Van Nostrand, 1943, page 33.